United States Patent [19]
Close et al.

[11] 3,961,907
[45] June 8, 1976

[54] CATALYTIC CONVERTER

[75] Inventors: James R. Close, Roberts, Wis.; William P. Wood, Stillwater; Robert A. Hatch, St. Paul; James R. Johnson, White Bear Lake, all of Minn.

[73] Assignee: Minnesota Mining and Manufacturing Company, St. Paul, Minn.

[22] Filed: Dec. 8, 1972

[21] Appl. No.: 313,272

[52] U.S. Cl. ................ 23/288 FC; 23/288 R; 29/157 R; 138/37; 138/108; 138/112
[51] Int. Cl.² .................. F01N 3/15; B01J 8/00
[58] Field of Search ........ 23/288 F, 288 R, 288 FC; 60/299; 252/477 R; 138/37, 108; 156/79; 29/157 R

[56] References Cited
UNITED STATES PATENTS

| | | | |
|---|---|---|---|
| 3,065,595 | 11/1962 | Gary | 23/288 F UX |
| 3,248,188 | 4/1966 | Chute | 23/288 F UX |
| 3,441,381 | 4/1969 | Keith et al. | 23/288 F |
| 3,441,382 | 4/1969 | Keith et al. | 23/288 F |
| 3,503,716 | 3/1970 | Berger | 23/288 F |
| 3,558,286 | 1/1971 | Gourdine | 23/288 F |
| 3,597,165 | 8/1971 | Keith et al. | 23/288 F |
| 3,709,751 | 2/1971 | Carlson et al. | 156/79 X |
| 3,713,782 | 1/1973 | Watt | 23/288 F |
| 3,771,967 | 11/1973 | Nowak | 23/288 F |
| 3,785,781 | 1/1974 | Hervert et al. | 23/288 F |
| 3,798,006 | 3/1974 | Balluff | 23/288 F |

FOREIGN PATENTS OR APPLICATIONS

| | | | |
|---|---|---|---|
| 962,180 | 7/1964 | United Kingdom | 138/112 |

*Primary Examiner*—Barry S. Richman
*Attorney, Agent, or Firm*—Alexander, Sell, Steldt & DeLaHunt

[57] ABSTRACT

Refractory catalyst supports are secured in metallic containers having different coefficients of thermal expansion by providing at least one layer of a resilient thermally resistant inorganic sheet material or paper between the support and casing and securing the paper and catalyst support in the container by foaming an inorganic material in the space between the sheet material or paper and catalyst support. A further layer of sheet material or paper may be provided adjacent the support with the foam between the separate layers of sheet material.

11 Claims, 8 Drawing Figures

CATALYTIC CONVERTER

This invention relates to catalyst supports and particularly to methods for retaining catalyst supports in metallic containers and to such enclosed or "canned" supports.

In the control of pollution by automobile exhaust effluents it has become widely recognized that catalytic devices of some type are needed for completion of the combustion of carbon monoxide, hydrocarbons and products of incomplete combustion and for the removal or detoxification of nitrogen oxides. Automobile design puts some limitations on the types of catalytic devices but it is believed relatively safe to assume that almost all devices will require a canister or container with a catalyst and support forming a unit which can be removed if necessary from a suitable container or device in the exhaust line of the automobile. This invention is concerned particularly with mounting a catalyst support in a canister or container. Such canisters can also be used in other situations where less high temperatures may be encountered as in kitchen exhaust systems.

It will be recognized that the period of activity of the catalyst, its chemical life, will be determined to a large extent by the rate of deterioration in catalytic activity either as a result of poisoning or possibly merely occlusion of the catalyst by gradual coating with slag, glass or other undesirable materials. This is primarily influenced by the ingredients in the exhaust stream and the composition of the catalyst support. Because rather long periods of usefulness of catalysts are desired, the method of mounting becomes especially important as it plays a significant role in the mechanical life of the catalyst. The mechanical life is the period during which the support remains sufficiently intact that exhaust gases flow through it so that they can be exposed to the catalytic effect. Mechanical attrition, breaking of the support as a whole or of portions, once started, will quickly accelerate and will render the device of little, if any, use. There is, then, a problem of mounting a catalyst support so that it will be relatively well protected from mechanical attrition, either from impact or more particularly from vibrations, both sidewise and lengthwise, and thermal cycling. It will be recognized that repeated heating and cooling of a system in which there are materials with different coefficients of thermal expansion can produce severe mechanical attrition and that the usual catalytic supports which are ceramic and the containers which are metal, such as stainless steel, do in fact have rather different coefficients of thermal expansion.

Because of the high ratio of surface area to volume or weight, a particularly useful type of catalyst support is a ceramic honeycomb as described and claimed in U.S. Pat. No. 3,444,925. Such ceramic honeycombs or somewhat similar structures are shown mounted in various containers, not necessarily as catalyst supports, for example, in U.S. Pat. Nos. 3,134,457; 3,163,258; 3,227,241; 3,227,242; 3,308,853; 3,675,398 and 3,692,497. Each attempts to solve the problem of reducing mechanical attrition, but, although some are relatively effective, they are all found in practice either to be too expensive or difficult to construct or to fail too soon. The use of mechanical constriction (U.S. Pat. No. 3,308,853) is a useful if rather difficult direct approach, whereas the use of packing material, such as fibers or foam may be relatively effective in a muffler, but less so when subjected to rather greater stress in catalytic devices. Mounting of a support in a container without packing material requires fitting to very close tolerances which increases costs of fabrication and is rather difficult to achieve.

It is a principal aim and object of this invention to provide an improved method for mounting a ceramic catalyst support in a metallic container. A further aim and object is to provide a container having a catalyst support securely mounted therein. A still further aim is to reduce the necessity for maintaining close tolerances between the catalyst support and its container. Other objects will become evident hereinafter.

In accordance with these and other objects and aims of the invention, it has been found that mounting a ceramic catalyst support in a suitable chamber or container is advantageously accomplished by using at least one layer or ply of a resilient thermally resistant inorganic sheet material which may be in immediate contact with the outer surface of the catalyst support or preferably is in contact with or adhered to the metallic casing and an organic, ceramic or inorganic cellular foam on the open side of the sheet material. The organic or inorganic foam is formed in situ at an elevated temperature which is selected for the particular foaming composition. In general, inorganic foams are preferred, but organic foams which are temperature resistant, i.e., carbonize or do not soften, may be used in some embodiments of the invention. In a preferred embodiment of the invention, two layers of sheet material are employed; an outer layer of resilient thermally resistant inorganic sheet material in contact with the metallic container, and an inner layer of the same in contact with the catalyst support. The cellular foam is then formed between the two layers at an elevated temperature. The sheet material adjacent the casing is advantageously adhered thereto by suitable adhesives, such as water glass or aluminum dihydrogen phosphate solution. Advantageously, foaming is effected after closure of the ends of the space so that foaming is in a confined space and desirably develops a pressure. In any event, the foaming exerts sufficient pressure that the catalyst support is firmly retained in the casing and the layer or layers of sheet material are retained in the desired position. The cellular foam is thus means for securing the catalyst support and sheet material in the casing. There is an advantage in having no continuous bond between the support and the casing as there is less transfer of mechanical stresses. Further, because the foam is formed at elevated temperatures at which the metal has reached part of its maximum dimensions, a part of the difference in coefficients of thermal expansion between the metal and ceramic is effectively cancelled. Compressive forces at lower temperatures, at which the metal contracts more rapidly than the ceramic, are partially absorbed by the layer of resilient inorganic paper and partially transmitted to the foam which may be as little as 1 mm. thick, but preferably should be of the order of at least 3 mm. thick and may be up to 100 mm. thick or more if desired for the additional thermal insulation provided. One of the advantages of the process of the invention is that it is not necessary to fabricate catalyst supports to close tolerances for mounting in a container also held to rather close tolerances. Numerous variations in support and casing can be made with no difficulties in achieving accurate fit. The necessity of grinding the support to an exact dimension is eliminated. Thicker layers of foam will be particularly necessary where the cross section of the catalyst support is not the same as the casing, for example, a rectangular support in an oval casing. The invention is, thus, not limited to the case of a cylindrical support in a cylindrical casing, but is also useful for various shapes of supports in various casings and even to including several supports, which may serve different catalytic purposes in the same casing. It is contemplated, for example, that three cylindrical catalyst supports can be employed in an oval casing with gases passing through the supports successively. It is also contemplated that the process may be used for support of ceramic structures within metal enclosures in general.

An advantage attained in articles made according to this invention is that longitudinal retention may be provided without interference with the open portion of the catalyst support. This is effective in reducing attrition due to lengthwise vibrations.

Various embodiments and modifications produced by the process of the invention are diagrammatically illustrated in FIGS. 1 – 8, wherein.

Figure 1:
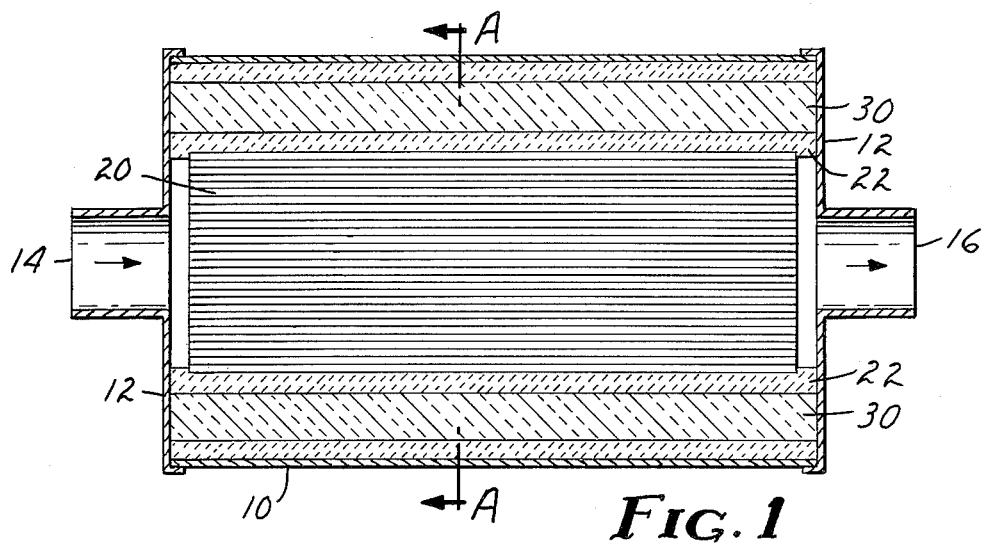
FIG. 1 is a longitudinal cross-sectional view of a canister according to the invention.
Figure 2:
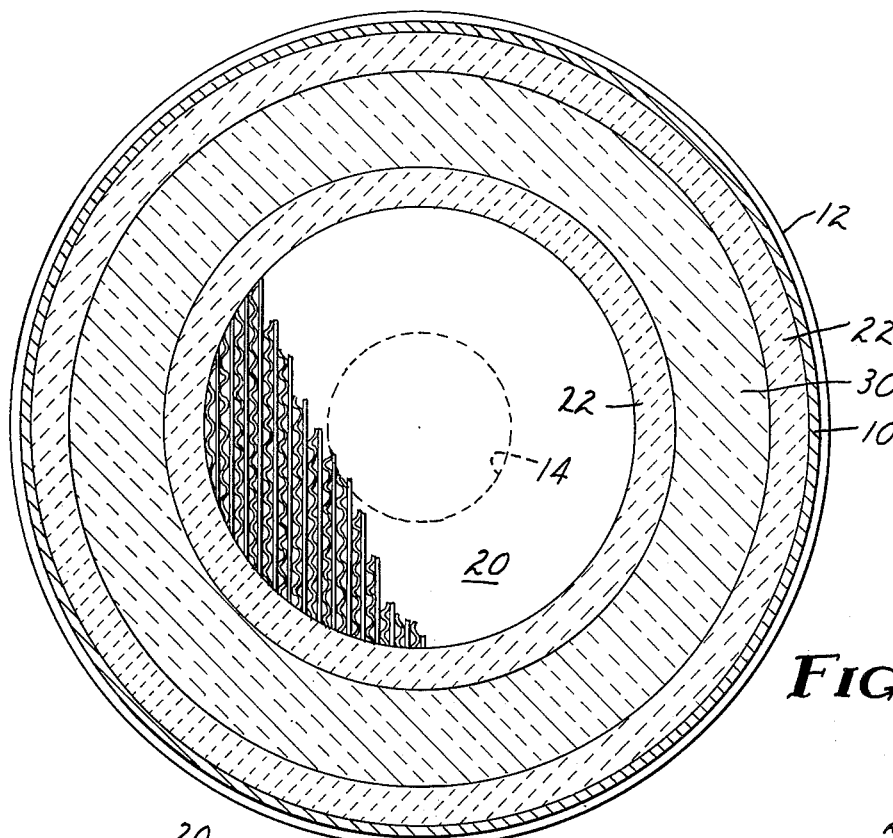
FIG. 2 is a cross-sectional view at AA of a cylindrical support in a cylindrical container in which two layers of resilient paper are used in a canister as shown longitudinally in FIG. 1.
Figures 3, 4:
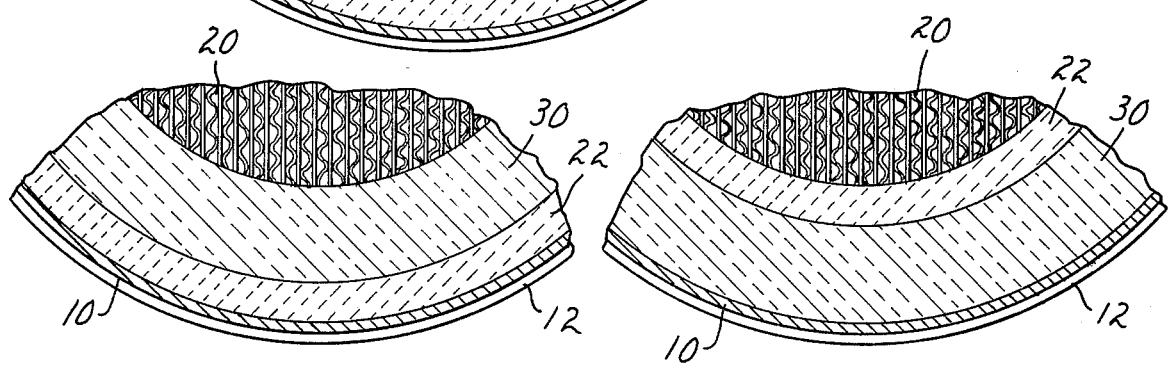
FIG. 3 shows a portion of a device as in FIG. 2 using only one layer of paper next to the casing.
FIG. 4 shows a portion of a device as in FIG. 2 using only one layer of paper next to the catalyst support.
Figure 5:
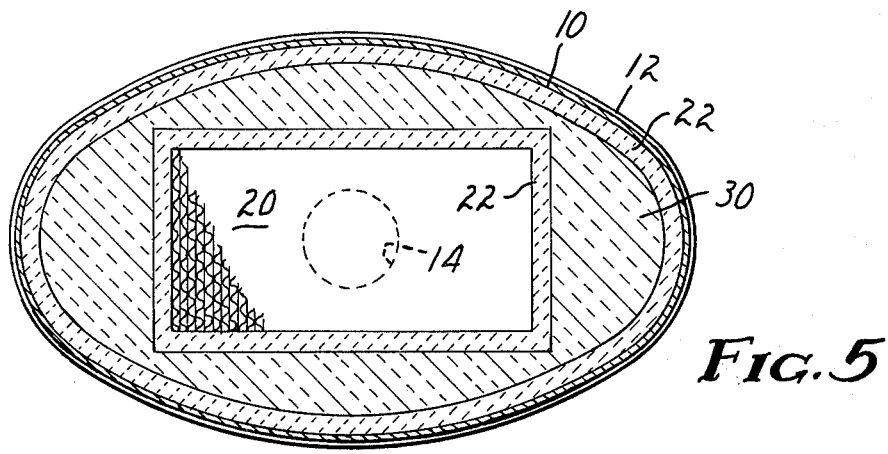
FIG. 5 is a cross-sectional view at AA of a rectangular (parallelepipedal) catalyst support in an oval casing of a cannister as shown in FIG. 1.
Figure 6:
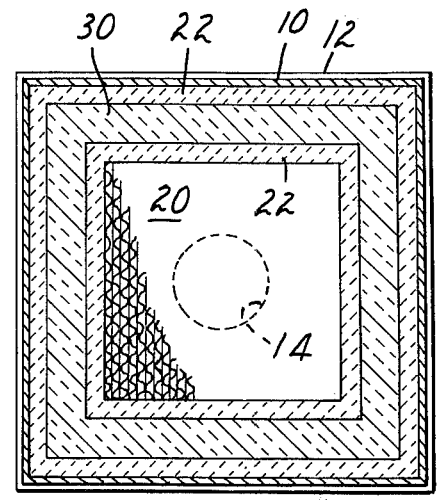
FIG. 6 is a cross-sectional view at AA of a square (parallelepipedal) catalyst support in a square casing of a cannister as shown longitudinally in FIG. 1.
Figure 8:
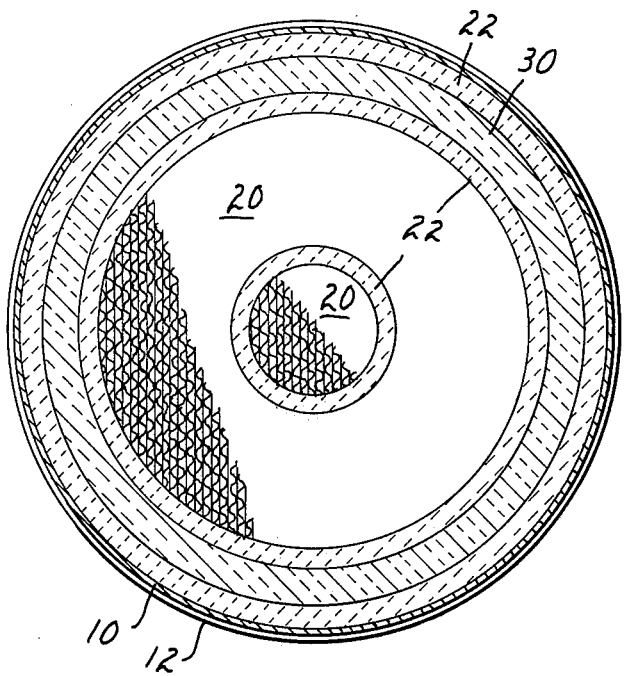
FIG. 8 is a partial top view of the device of FIG. 7 in which cylindrical and annular catalyst supports are used concentrically.
Figure 7:
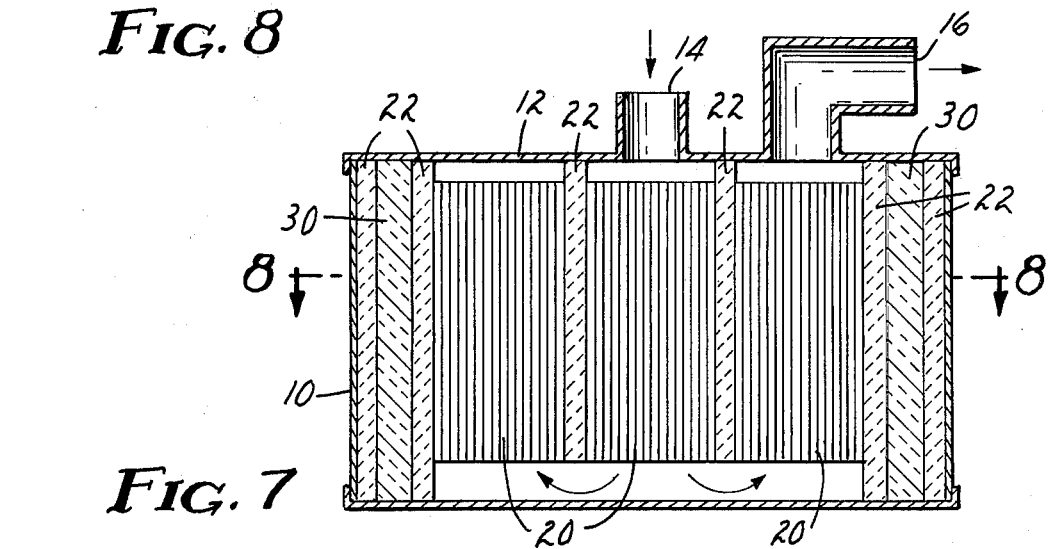
FIG. 7 is a vertical cross-section.

In the figures, analogous parts bear the same indicia. Casings 10, having end portions 12 (shown only in the longitudinal sectional view of FIG. 1 and in FIG. 7) with inlet and outlet ports 14 and 16, enclose catalyst supports 20, layers of resilient inorganic paper 22 and cellular foam 30 retaining supports and paper in the respective casings. It will be seen in FIG. 1 that resilient inorganic paper 22 encircles the girth of catalyst support 20. It will be seen (particularly FIGS. 1 and 7) that end portions 12 are urged against cellular foam 30 so that longitudinal motion is restricted not only of foam 30, but also of the adjacent paper 22 and of supports 20 which are tightly wedged into the casing by the foamed-in-place formation of the cellular foam 30.

The resilient thermally resistant inorganic sheet materials may be of several types which contain 30 – 85% and preferably 60 – 75% by weight of refractory fibers and have a compressibility (by ASTM F-36-66 test as modified) of at least 10% of which a significant portion is elastically recoverable, that is, the sheet material is resilient. These sheet materials may include organic materials which are believed to be partially retained in the sheet material nearer the casing of the instant invention although partially burned out when nearer the catalyst support. In any event, the resilient inorganic sheet material is not usually heated so high as to result in its conversion to a brittle or friable ceramic state. Sheet materials of suitable properties may be produced using teachings of U.S. Pat. Nos. 2,493,604; 2,633,433; 3,014,835; 3,017,318; 3,253,978; and 3,554,861. It is contemplated that single sheets or plies may be used or several thinner sheet materials may be combined to give a thicker layer if desired.

Because many of the available sheet materials contain asbestos which is known to have deleterious effects on humans, it is usually preferred to employ sheet materials which are free from asbestos. A particularly preferred sheet material is made as a paper by first vigorously agitating (suitably a Waring blender) 1800 parts water with 3 parts zinc oxide, 24 parts of ball clay and 6 parts of wood fiber pulp such as kraft paper pulp for about ¾ minute, then adding 36 parts of refractory mineral fiber such as silica, aluminosilicate or other glassy or crystalline fibers and agitating vigorously for a further ¾ minute. The speed is lowered and 60 parts of a 5% rubber latex are added, followed at a lower speed by 30 parts of 10% solution of alum and finally, before agitation has stopped completely by 30 parts of a 1% solution of an anionic polyelectrolyte to flocculate the slurry to form agglomerates which can be filtered rapidly on a screen. The flocked slurry is used as a furnish and converted to paper on a screen and dried. The modifications made in ASTM F-36-66 for testing are to replace the penetrator with an anvil 2 inches (5.1 cm.) square and the major load is reduced from 250 lb. to 27.5 lb. (12.5 kg). No control of humidity is maintained. The test is first to record the dial reading with no sample ($t_o$). The sample is inserted and surface irregularities are removed by applying a 5 lb. (2.26 kg) weight on the tray for 5 seconds. The dial reading ($t_1$) is recorded with only the gauge anvil and tray in place (total about 5.2 lb. or 2.36 kg). Then the major load as noted is applied and after 60 seconds the dial reading ($t_2$) is recorded and the load is removed and the dial reading ($t_3$) again recorded after a further 60 seconds.

$$\% \text{ Compressibility} = \frac{t_1 - t_2}{t_0 - t_1} \times 100$$

$$\% \text{ recovery} = \frac{t_3 - t_2}{t_1 - t_2} \times 100$$

Inorganic foams which can be used are generally those which are foamed by heating so that there is at least partial burn out of organic components and also part of the thermal expansion of the casing is compensated for as noted above. Organic foams which are carbonized to a stable condition or do not soften may be employed in many instances. The foamed ceramic must be essentially cellular, that is with interconnected bubbles at a minimum and no continuous passages therethrough after formation. The incorporation of surfactants may assist in achieving this cellular structure. During formation the foaming should exert a pressure of at least about one third atmosphere (5 p.s.i.).

Numerous ceramic foams are available, such as, for example, those of U.S. Pat. Nos. 3,148,996; 3,150,988; 3,330,675; 3,382,082 and 3,574,646. A particularly useful procedure involves the use of B stage polycarbodiimide powder as a foaming agent as described in the copending Reich application Ser. No. 242,838 having a common assignee. The use of this polycarbodiimide has the advantage that a strong temporary organic bond is formed which is subsequently replaced to an extent by inorganic bonds by using an aluminum dihydrogen phosphate solution. The foaming composition is made by mixing 90 parts of tabular alumina (commercially available) in a suitable container with 10 parts of polycarbodiimide powder made from toluene diisocyanate as described in application Ser. No. 242,838. The two solids are thoroughly mixed dry and then with sufficient monoaluminum phosphate solution (about 20 – 30 parts by volume of 50% solution) to give a slurry of pourable consistency. This may be poured into the position where desired or a layer may be painted, sprayed or knife coated over one or more of the parts to be covered by foam and the combination then heated at about 140° C. or somewhat higher to effect foaming and partial hardening of the foamed ceramic. This foam as initially produced at a moderate temperature is not sufficiently rigid to resist vibration damage although possessing resilience due to retained water and residual organic matter. Stability to moisture and thermal cycling is attained by further firing to at least 260° C and preferably to at least 500° C. At these higher temperatures, organic matter is at least partially burned out and water-sensitive aluminum dihydrogen phosphate is converted to aluminum pyrophosphate or orthophosphate. The ceramic foam is then stable to above 1000° C. at least for short times. Aluminum orthophosphate is stable to about 1500° C. at least for short exposures. It will be recognized that the ceramic foam will not usually be exposed to as high temperatures as those reached in the catalytic portion of a unit.

A catalyst support with platinum catalyst therein is mounted in a casing using the above resilient paper and cellular foam as shown in the figures and is found to offer prolonged resistance to mechanical vibration both lengthwise and sidewise and to thermal cycling. It is further possible to mount the ceramic honeycomb and deposit catalyst on that. This procedure is useful with any catalyst. The cellular foam and formation thereof in a confined space assure tight seals to reduce or substantially eliminate bypassing of the catalyst by fluent gases or liquids.

Catalyst supports may be of any convenient composition as desired provided only that they are rigid and exert relatively small resistance to flow of gases. Suitable minerals include cordierite, alumina, silica, mullite, petalite, zircon and such refractories. They may be overlaid by high surface area coatings or may be of high surface area materials as is known in the art. They may be of alternating corrugated and flat sheets or of all corrugated sheets or they may be of hexagonal cell structure. They are occasionally referred to as honeycomb structures, but are not limited to any particular structure although those produced by the processes of U.S. Pat. No. 3,444,925 are particularly useful.

Casings are made of whatever materials may be desired. Steel of various types, including stainless steel, are especially useful but are no limitation.

As described herein, the combination of casing and enclosed catalyst support may be termed a cannister, but that term is not intended to be restricted to a unit requiring further containment as it may be inserted in a gas line without an external container in much the way a muffler or resonator is inserted in an exhaust line. It will be understood that a broad meaning is to be attached to the term cannister.

What is claimed is:

1. A cannister comprising a casing having openings therein for introduction and exhaust of a gas stream, at least one frangible monolithic catalyst support within said casing and spaced therefrom, said catalyst support having passageways therethrough and containing catalyst thereon, said passageways providing open ends aligned with the openings of said casing, and said casing further comprising resilient inorganic sheet material and high temperature resistant cellular foam encircling the girth of said catalyst support within the space between said casing and said catalyst support, said cellular foam exerting pressure firmly securing said sheet material and said catalyst in said casing.

2. A canister according to claim 1 wherein the cellular foam is inorganic.

3. A canister according to claim 2 wherein the cellular foam comprises alumina and aluminum phosphate.

4. A canister according to claim 1 wherein there are two sheets of resilient inorganic sheet material, one adjacent the casing and the other adjacent the catalyst support and the cellular foam is between the two sheets.

5. A canister according to claim 1 having a platinum catalyst on the catalyst support.

6. A cannister according to claim 1 wherein the catalyst support is a ceramic honeycomb.

7. A canister according to claim 1 wherein the foam is ceramic.

8. A canister according to claim 1 wherein three frangible monolithic catalyst supports are arranged in series within and spaced apart from the casing, said catalyst supports having resilient inorganic sheet material and high temperature resistant cellular foam encircling them at their girths within the space between them and the casing.

9. A canister according to claim 1 having cellular foam within the casing overlapping the ends of at least one catalyst support therein.

10. A canister according to claim 1 having oxidation catalyst on the catalyst support.

11. A canister according to claim 1 having reducing catalyst on the catalyst support.

* * * * *